United States Patent
Chung et al.

(10) Patent No.: US 8,832,451 B2
(45) Date of Patent: Sep. 9, 2014

(54) PACKET SOURCE AUTHENTICATION METHOD USING SINGLE-BUFFERED HASH IN MULTICAST ENVIRONMENT AND APPARATUS FOR THE SAME

(75) Inventors: Bo Heung Chung, Daejeon (KR); Jeong Nyeo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 7 days.

(21) Appl. No.: 13/593,469

(22) Filed: Aug. 23, 2012

(65) Prior Publication Data
US 2013/0054974 A1 Feb. 28, 2013

(30) Foreign Application Priority Data
Aug. 24, 2011 (KR) ........................ 10-2011-0084810

(51) Int. Cl.
*H04L 9/32* (2006.01)
*H04L 9/08* (2006.01)

(52) U.S. Cl.
CPC ........... *H04L 9/0861* (2013.01); *H04L 2209/38* (2013.01); *H04L 9/3236* (2013.01)
USPC ........... 713/181; 713/155; 713/163; 713/168; 726/7; 726/13; 726/26; 709/232

(58) Field of Classification Search
CPC ............................ H04L 63/08; H04L 65/4076
USPC ................ 713/168, 181, 155, 163; 726/1–36; 705/72; 709/232
See application file for complete search history.

(56) References Cited

U.S. PATENT DOCUMENTS

| | | | |
|---|---|---|---|
| 8,161,353 B2 * | 4/2012 | Flynn et al. | 714/763 |
| 2005/0080916 A1 * | 4/2005 | Katayama | 709/232 |
| 2005/0174236 A1 * | 8/2005 | Brookner | 340/539.26 |
| 2006/0198373 A1 * | 9/2006 | Hasegawa et al. | 370/390 |
| 2007/0016788 A1 * | 1/2007 | Kakehi | 713/176 |
| 2008/0082831 A1 * | 4/2008 | Fujimaki | 713/178 |
| 2008/0155670 A1 * | 6/2008 | Umesawa et al. | 726/6 |
| 2009/0265558 A1 * | 10/2009 | Izu et al. | 713/176 |

(Continued)

FOREIGN PATENT DOCUMENTS

| WO | WO 9940702 A1 * | 8/1999 | H04L 9/32 |
|---|---|---|---|
| WO | WO 2008/031762 A1 | 3/2008 | |

OTHER PUBLICATIONS

Alain Pannetrat, R'efik Molva; Authenticating Real Time Packet Streams and Multicasts; 2002; IEEE, pp. 490-495.*

(Continued)

*Primary Examiner* — Luu Pham
*Assistant Examiner* — Fahimeh Mohammadi (57) ABSTRACT

A source authentication method and apparatus according to the present invention are disclosed. The source authentication method is performed with respect to a transmission packet on a message transmission side, and includes generating a first hash value to which a first hash function is applied using a message to be included in a next packet and a key value, and generating the transmission packet including the first hash value, wherein the key value is one of at least one key value generated in advance by applying a second hash function. Meanwhile, according to the present invention, effective low-cost multicast authentication may be performed by reducing a variety of loads such as buffer management, key calculation costs, and the like.

8 Claims, 6 Drawing Sheets

(56) References Cited

U.S. PATENT DOCUMENTS

2009/0307495 A1* 12/2009 Matsuo .................. 713/171
2011/0131646 A1* 6/2011 Park et al. .................. 726/13
2011/0208947 A1* 8/2011 Lin et al. .................. 712/28
2011/0321145 A1* 12/2011 Shimotono .................. 726/7

OTHER PUBLICATIONS

Jung Min Park et al., Efficient Multicast Packet Authentication Using Signature Amortization, 2002, IEEE, pp. 227-240.*

Qiming Li et al., On the Practical and Security Issues of Batch Content Distribution Via Network Coding, Nov. 2006, IEEE, pp. 158-167.*

Jinxin He et al., LMCM: Layered Multiple Chaining Model for Authenticating Multicast Streams, Aug. 2008, IEEE, pp. 206-211.*

Jeung-Mi Rim et al., "A Design and Analysis of Authentication Scheme for Tolerating Packet Loss in the Multicast Environment", Dec. 2003, pp. 163-172.

Kihun Hong et al., "An Efficient Authentication Scheme for Multicast Packet using Recovery Layer", Jun. 2004, pp. 63-73.

* cited by examiner

PACKET SOURCE AUTHENTICATION METHOD USING SINGLE-BUFFERED HASH IN MULTICAST ENVIRONMENT AND APPARATUS FOR THE SAME

CLAIM FOR PRIORITY

This application claims priority to Korean Patent Application No. 10-2011-0084810 filed on Aug. 24, 2011 in the Korean Intellectual Property Office (KIPO), the entire contents of which are hereby incorporated by reference.

BACKGROUND

1. Technical Field

Example embodiments of the present invention relate in general to a source authentication method and apparatus in a multicast environment and more specifically to a source authentication method and apparatus which may use a single-buffered hash in an issuer/subscriber environment using a multicast transmission scheme.

2. Related Art

In recent years, due to devices that provide high-performance and convenient network functions such as personal computers (PCs), portable terminals, and the like, demands for a variety of distribution services using a distributed middleware such as Common Object Request Broker Architecture (CORBA) or Data Distribution Service (DDS) have increased.

However, in this environment, a simple structure in which a system is classified according to an issuer and a subscriber, data of the issuer himself or herself is publicized, and the subscriber requests data from the issuer for providing the subscriber's desired information according to the publicized data to thereby provide services for the request has been used.

Accordingly, in addition to integrity for ensuring that the transmitted data has not been changed in the middle, source authentication as to whether the transmitted data has been transmitted from a proper issuer is necessarily required.

That is, a means for preventing packet re-transmission or preventing false information caused by a malicious subscriber impersonating the issuer from being transmitted to other subscribers is needed.

For the above-described source authentication, the issuer uses methods such as a method that uses electronic signatures or a method that uses a one-way hash after time synchronization or a hash chain for packets before and after.

However, these methods have limitations for the following reasons.

1) In the method of using the electronic signatures, the issuer adds an electronic signature using his or her own private keys to each packet to be transmitted, and the subscribers confirm the signature using a public key of the issuer to thereby verify each packet. In the case of the method of using the electronic signature, the issuer and the subscriber have to operate based on authentication, and therefore there is a problem that time and calculation loads may be generated compared to the method using the hash.

2) In the method that uses the one-way hash after time synchronization, the issuer and the subscriber synchronize time, and then classify the time at regular intervals. Thereafter, a message authentication code (MAC) is generated using a unique secret key for each time interval, and the generated MAC is added to the packet. These secret keys are calculated using a one-way hash function. Here, a predetermined number m of secret keys are generated in advance and used in the reverse order. That is, a key value K1 is publicized to all subscribers using a key value of $k1=F(k2)$ for a time t1 and using a key value of $k2=F(k3)$ for a time t2.

For this, the issuer determines an $m^{th}$ key value of km, calculates the key value in the order of $km-1, \ldots, k2, k1, k0$, and then publicizes a value of k0 to each subscriber. In this manner, when an MAC of a packet is calculated using k1 during the time t1 to thereby be transmitted, the subscribers are unable to know a value of k1 before the time t2, and therefore a malicious subscriber is prevented from impersonating the issuer, and thereby source authentication is made possible.

However, in this method, subscribers should buffer all packets transmitted during a specific time t1, so that the packets buffered during the previous time can be authenticated using k1 that is to be publicized during the next time t2. That is, there is a problem that authentication delay occurs by an amount of a time period. In addition, there is a problem that the issuer and the subscriber have to synchronize time in order to use this method.

3) In the method that uses the hash chain, a hash value for a data integrity test is used to calculate a hash value of the previous or the next packet. That is, when P denotes a packet, M denotes a message, H(M) denotes a hash value for M, and H(P) denotes a hash value for P, $P1=M1+H(M1)$, $P2=M2+H(P1)$, and $P3=M3+H(P2)$ are calculated in a method that uses the previous packet, and the final packet $Pm=Sign(H(Pm-1))$ is transmitted by electronically signing a hash value of the previous packet. A method that uses the next packet performs this in the reverse order. However, since, in the method that uses the hash chain, all data to be transmitted should be buffered by the issuer or the subscriber, and then source authentication is made possible, there is a problem that the method is difficult to use as a real-time authentication method. That is, there are problems that a packet of Pm−1 can be authenticated using a value of H(Pm−1) after the packets from P1 to Pm arrive at the subscriber, and the previous packet can be verified using a value of H(Pm−2) of the previous packet included in the packet of Pm−1 after integrity of the packet of Pm−1 is ensured.

SUMMARY

Accordingly, example embodiments of the present invention are provided to substantially obviate one or more problems due to limitations and disadvantages of the related art.

Example embodiments of the present invention provide a source authentication method for effectively performing source authentication by transmitting data without time synchronization in a multicast transmission environment, and minimizing a buffering load on a transmission side or a reception side.

Example embodiments of the present invention also provide a source authentication apparatus for effectively performing source authentication by transmitting data without time synchronization in a multicast transmission environment, and minimizing a buffering load on a transmission side or a reception side.

In some example embodiments, a source authentication method which is performed with respect to a transmission packet on a message transmission side includes: generating a first hash value to which a first hash function is applied using a message to be included in a next packet and a key value; and generating the transmission packet including the first hash value, wherein the key value is one of at least one key value generated in advance by applying a second hash function.

Here, the source authentication method may further include digitally signing the transmission packet when the transmission packet is an initial packet.

Here, when the transmission packet is not an initial packet, the transmission packet may be generated by further including a message to be currently transmitted.

Here, the second hash function may be a one-way hash function, and the key value may be one of at least one key value generated by applying the one-way hash function before generating an initial transmission packet.

Here, the key value used in the generation of the first hash value may be included in a $2n^{th}$ (n being a natural number) transmission packet after the initial packet is transmitted to thereby be transmitted, one different key value may be selected from among the key values generated in advance as the key value used in the generation of the first hash value after the transmission packet including the key value is transmitted, and the one different key value may be selected in the opposite order to that in which the key values are generated.

Here, the source authentication method may be performed in a multicast transmission environment, and the message transmission side may be a message issuer and a message reception side may be a message subscriber.

In other example embodiments, a source authentication method which is performed with respect to a reception packet on a message reception side, includes: verifying a message including generating a verification hash value by applying a first hash function using a message to be included in the reception packet and a key value when the reception packet is not an initial packet, and determining the reception packet as a packet from a normal source when the verification hash value is equal to a hash value received through a previous packet based on a comparison therebetween, wherein the key value included in the reception packet or a key value received through the previous packet is used as the key value.

Here, when the reception packet is determined as the packet from the normal source in the verification of the message, and the key value is included in the reception packet, the source authentication method may further include verifying a key value including determining the reception packet as the packet from the normal source when a value generated by applying a one-way hash function to the key value included in the reception packet is equal to a previously transmitted key value based on a comparison therebetween.

Here, when the reception packet is the initial packet, the reception packet may be determined as the packet from the normal source by verifying digital signature included in the reception packet.

In still other example embodiments, a source authentication apparatus with respect to a transmission packet, for a message issuer side of a multicast transmission environment includes: a message buffer in which a message to be transmitted is stored; a key value selection unit that selects one key value to be used in generation of a first hash value from among at least one key value generated in advance, and generates the key values in advance by applying a one-way hash function when the transmission packet is an initial packet; a hash value generation unit that generates the first hash value by applying a first hash function using a message to be included in a next packet and the key value generated by the key value selection unit; and a packet generation unit that generates the transmission packet including the first hash value, wherein the packet generation unit generates the transmission packet by enabling the transmission packet to further include the message stored in the message buffer when the transmission packet is not the initial packet, and stores, in the message buffer, the message to be included in the next packet after generating the transmission packet.

Here, the packet generation unit may generate the transmission packet by enabling the key value used in the generation of the first hash value to be included in the transmission packet when the transmission packet is a $2n^{th}$ (n being a natural number) packet after the initial packet, the key value selection unit may select one different key value from among the generated key values after the transmission packet including the key value is generated, and the one different key value may be selected in the opposite order to that in which the key values are generated.

In yet other example embodiments, a source authentication apparatus with respect to a reception packet, for a message subscriber side of a multicast transmission environment, includes: a first packet buffer in which a hash value included in a previous reception packet and a key value are stored; and a message verification unit that verifies a message included in the reception packet using the hash value stored in the first packet buffer, wherein, when the reception packet is not an initial packet, the message verification unit generates a verification hash value using the message included in the reception packet and the key value stored in the first packet buffer or a key value included in the reception packet, determines the reception packet as a packet from a normal source when the verification hash value is equal to the hash value stored in the first packet buffer based on a comparison therebetween, and stores, in the first packet buffer, the hash value and the key value which are included in the packet.

Here, the source authentication method further include a second packet buffer in which a hash value included in a most recent packet including the key value among the previous reception packets and the key value are stored; and a key value verification unit that verifies the key value included in the reception packet, wherein, the message verification unit determines the reception packet as the packet from the normal source when the key value is included in the reception packet, the key value verification unit determines the reception packet as the packet from the normal source when a value generated by applying a one-way hash function to the key value included in the reception packet is equal to the key value stored in the second packet buffer based on a comparison therebetween, and the hash value and the key value which are included in the reception packet are stored in the second packet buffer.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, embodiments of the present invention will be described in detail with reference to the accompanying drawings.

Hereinafter, a multicast source authentication method and apparatus which are effective for an issuer and a subscriber in a multicast environment according to an embodiment of the present invention are disclosed.

The source authentication method and apparatus in the multicast environment according to an embodiment of the present invention use a method of calculating a hash value by combining a message of a next packet to be transmitted and a key value, and transmitting the calculated hash value to a previous packet. For this, in general, a plurality of packet buffers for storing a message on a transmission side and a reception side and calculating and verifying the hash value should be operated, but the method according to the embodiment of the present invention may implement a source authentication process with only one packet buffer on each of the transmission side and the reception side.

Through this method, effective low-cost multicast authentication may be performed by reducing a variety of loads such as buffer management for performing source authentication in the multicast environment, key calculation costs, and the like.

Hereinafter, among used terminologies, M denotes a message to be transmitted, H denotes a hash function for calculating a hash value with respect to a message, and K denotes a used key value such as in hash value calculation.

A publicized hash function such as MD5 (Message-Digest algorithm 5) or SHA1 (Secure Hash Algorithm 1) may be used as the hash function H, MD5 or SHA1 may be used as a one-way function F for calculating the key value K. However, it is preferable that the function F having higher stability be used.

Meanwhile, the present invention is basically operated based on S/W, and operations such as generation and verification of authentication information about the multicast source authentication are developed in the form of a plug-in module to be thereby provided, and thus may be easily connected with an existing distributed middleware.

In addition, since a structure of this security middleware can be easily applied in the form of hardware, the security middleware may be developed in the form of TPM (Trusted Platform Module) or security USB-type hardware.

Hereinafter, a source authentication method and apparatus in a multicast environment according to an embodiment of the present invention will be described with reference to the accompanying drawings.

A source authentication apparatus and process in a multicast environment according to an embodiment of the present invention will be first described, and then a source authentication method according to an embodiment of the present invention will be described in more detail using a schematized example.

Figure 1:
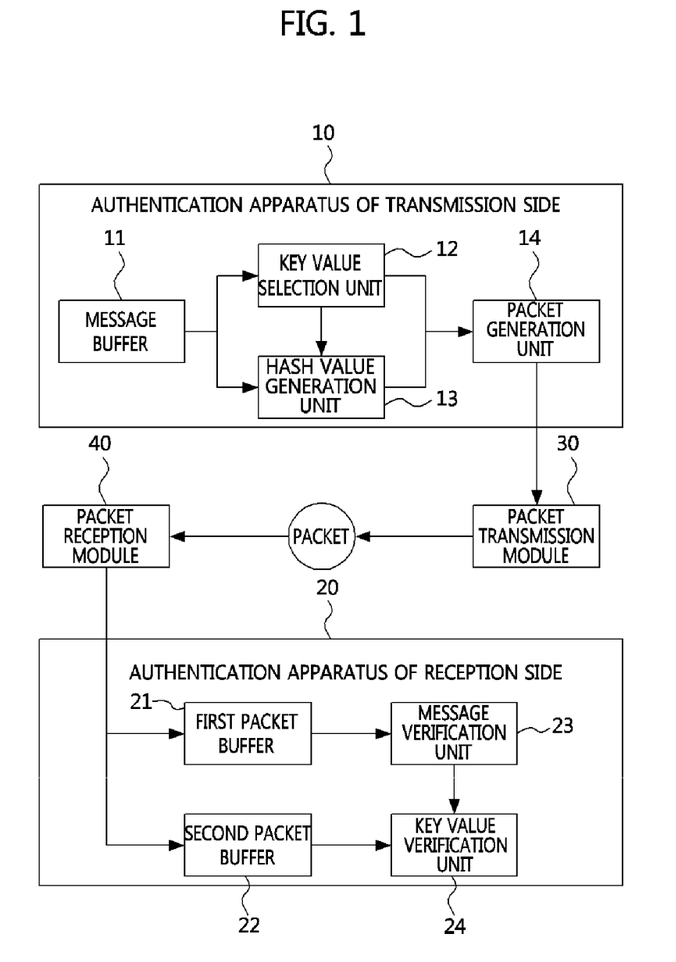
FIG. 1 is a conceptual diagram illustrating a source authentication apparatus of a transmission side, a source authentication apparatus of a reception side, and a connection relationship therebetween according to an embodiment of the present invention.

Source Authentication Apparatus in Multicast Environment According to an Embodiment of the Present Invention FIG. 1 is a conceptual diagram illustrating a source authentication apparatus of a transmission side, a source authentication apparatus of a reception side, and a connection relationship therebetween according to an embodiment of the present invention.

Referring to FIG. 1, a source authentication apparatus of a packet according to an embodiment of the present invention includes an authentication apparatus of a transmission side and an authentication apparatus 20 of a reception side, and the two apparatuses are connected to each other through transmission/reception of packets.

Hereinafter, the authentication apparatus 10 of the transmission side and the authentication apparatus 20 of the reception side according to an embodiment of the present invention will be sequentially described with reference to FIG. 1, and then a connection relationship between the two apparatuses will be described.

Referring to FIG. 1, the authentication apparatus 10 of the transmission side according to an embodiment of the present invention includes a message buffer 11, a key value selection unit 12, a hash value generation unit 13, and a packet generation unit 14.

Referring to FIG. 1, the authentication apparatus of the transmission side according to an embodiment will be described as follows.

The authentication apparatus 10 of the transmission side is an apparatus for source authentication with respect to packets at the time of generation of the packets on a message transmission side, and may be a source authentication apparatus with respect to a transmission packet which is carried out on a message issuer side in a multicast transmission environment. The authentication apparatus of the transmission side is carried out in the front stage of the packet transmission unit.

In the message buffer 11, a message to be transmitted is stored.

The key value selection unit 12 selects one key value to be used in generation of a hash value for authentication from among a plurality of key values which are generated in advance. However, when the message to be transmitted is an initial message, the plurality of key values are generated by applying a one-way hash function.

Meanwhile, the key value selection unit 12 selects one different key value from among the key values generated in advance after the key value is publicized, that is, after a transmission packet including the key value is generated and transmitted. For example, every time a $2n^{th}$ packet (n being a natural number) is transmitted after transmission of the initial packet, that is, every time a second packet, a fourth packet, a sixth packet, . . . are transmitted, the key value may be publicized. In this instance, it is preferable that newly selected key values be selected in the opposite order to that in which the key values are generated.

The hash value generation unit 13 generates a hash value by applying a hash function using a message to be included in a next packet and the key values generated by the key value selection unit 12.

The packet generation unit 14 generates a packet to be transmitted including the hash value generated by the hash value generation unit 13, and when the packet to be transmitted is not an initial packet, enables the message to be transmitted, which is stored in the message buffer 11 at the time of generation of the packet, to be included in the packet to thereby generate the packet.

Meanwhile, when the packet to be transmitted is a $2n^{th}$ (n being a natural number) packet after transmission of the initial packet, the packet generation unit 14 may enable the key value used in the generation of the hash value to be included in the packet.

In this manner, when the packet including the key value is generated, a corresponding key value is publicized to reduce security, so that the key value selection unit 12 selects a new key value.

When the packet to be transmitted is generated, the packet generation unit 14 stores the message to be included in the next packet in the message buffer, and thereby the stored message is referred to as a message to be included in a current packet when the next packet is generated.

Next, a configuration and a connection relationship of the authentication apparatus of the reception side will be described.

In addition, referring to FIG. 1, the authentication apparatus 20 of the reception side according to an embodiment of the present invention includes a first packet buffer 21, a second packet buffer 22, a message verification unit 23, and a key value verification unit 24.

The authentication apparatus 20 of the reception side is an apparatus for source authentication with respect to a reception packet of a message reception side, and is a source authentication apparatus with respect to the reception packet which is carried out in a message subscriber side in a multicast transmission environment.

The first packet buffer 21 is a portion in which a hash value included in a previous reception packet and a key value are stored, and used to verify a message.

The second packet buffer 22 is a portion in which a hash value included in a most recent packet including the key value among the previous reception packets and the key value are stored, and used to verify the key value. That is, since the key value is included in one packet for each two packets to be publicized, information of the previous packet which includes the key value and is transmitted is stored in the second packet buffer as the previous packet for verifying the key value.

Meanwhile, when only message verification is needed according to a communication condition, the second packet buffer 22 may not be used.

The message verification unit 23 verifies a message included in the reception packet using the hash value stored in the first packet buffer 21.

In this instance, when the reception packet is not an initial packet, a verification hash value is generated using a message included in the reception packet, the key value included in the first packet buffer, and the key value included in the reception packet, and the reception packet is determined as a packet from a normal source when the verification hash value is equal to the hash value stored in the first packet buffer based on a comparison therebetween.

In addition, when the reception packet is determined as a normal packet, data included in the packet is stored in the first packet buffer.

The key value verification unit 24 verifies a key value included in the reception packet. Here, when the message verification unit 23 determines the reception packet as the packet from the normal source, the key value verification unit 24 determines the reception packet as the packet from the normal source when a value generated by applying a one-way hash function to the key value included in the reception packet is equal to the key value stored in the second packet buffer based on a comparison therebetween, and stores the hash value included in the reception packet and the key value in the second packet buffer 22.

When only message verification is sufficient according to a communication condition, the key value verification unit 24 may not be included in the configuration of the apparatus of the present invention.

Hereinafter, connection of each component between the authentication apparatus 10 of the transmission side 10 and the authentication apparatus 20 of the reception side will be briefly described.

The message to be transmitted is stored in the message buffer 11, and the corresponding message is transmitted to the key value selection unit 12 and the hash value generation unit 13.

When the transmitted message is an initial message, the key value selection unit 12 generates K0, K1, K2, ..., K using a one-way hash function F, and uses the generated values as key values.

In addition, the values are transmitted to the hash value generation unit 13, and used when calculating the hash value with respect to the message.

Next, the packet generation unit 14 combines a value Ki transmitted from the key value selection unit 12 and the hash value transmitted from the hash value generation unit 13 to thereby generate a packet to be transmitted.

In this instance, when the packet to be transmitted is an initial packet, a digital signature process is performed on the packet. In this manner, the generated packet is sent to a packet transmission module 30 to be transmitted.

Meanwhile, the packet reception module 40 receives the packet which is generated in the authentication apparatus 10 of the transmission side and transmitted, and transmits the received packet to the authentication apparatus 20 of the reception side.

In the authentication apparatus 20 of the reception side, the packet transmitted from the packet reception module 40 is transmitted to the first packet buffer 21, and then the transmitted packet is transmitted to the message verification unit 23.

The message verification unit 23 calculates a hash value with respect to a current packet, determines whether the calculated hash value is equal to a hash value H (Mi+Kj) stored in the first packet buffer 21, and then blocks the packet when the hash value is not equal to the hash value H (Mi+Kj).

However, in this instance, when the packet is an initial packet, the determination is performed by verifying a digital signature value.

In this process, it is assumed that subscribers previously have a public key of the issuer via a separate channel.

Hereinafter, a source authentication process of packets of a transmission side and a reception side in a multicast environment according to an embodiment of the present invention will be described in more detail with reference to the drawings.

Figure 2:
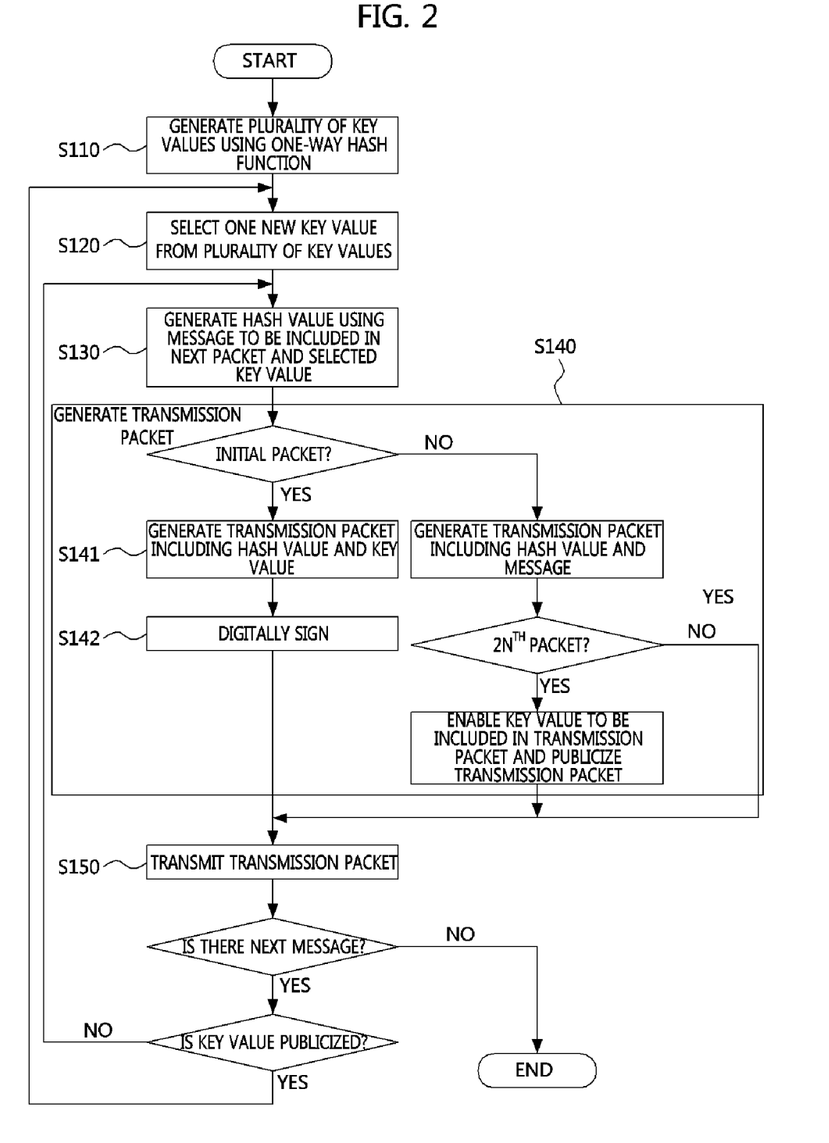
FIG. 2 is a flowchart illustrating a generation process of a packet including authentication information on a transmission side according to an embodiment of the present invention.

Source Authentication Process in Multicast Environment According to the Present Invention FIG. 2 is a flowchart illustrating a generation process of a packet including authentication information on a transmission side according to an embodiment of the present invention.

Referring to FIG. 2, a generation process of a packet including authentication information of the transmission side according to an embodiment of the present invention includes a key value generation step S110, a key value selection step S120, a hash value generation step S130, a packet generation step S140, and a packet transmission step S150.

In addition, referring to FIG. 2, the generation process of the packet including the authentication information of the transmission side according to an embodiment of the present invention will be described as follows.

In the key value generation step S110, a plurality of key values are generated by applying a one-way hash function before generating an initial packet.

In this manner, the generated key values are used together with a corresponding message when generating a hash value with respect to a message to be included in a next packet.

In the key value selection step S120, one key value from among the plurality of key values generated in the key value generation step S110 is selected to be used at the time of generation of the hash value. In this instance, the key value may be newly selected for each packet, but a new key value may be selected every time a $2n^{th}$ transmission packet (n being a natural number) is generated after transmission of the initial packet in order to enhance security, that is, for each of a second packet, a fourth packet, a sixth packet, ..., and may be used at the time of generation of the hash value.

Meanwhile, it is preferable that the key value be selected in the opposite order to that in which the key values are generated to thereby enhance security, and the selected key value be verified on the reception side.

Detailed description of selection and verification of the key value will be described below.

In the hash value generation step S130, a hash value is generated by applying a hash function using a message to be included in a next packet and the key value. In this manner, the generated hash value is included in the packet to be transmitted, and may be used to verify a message of a next packet on the reception side.

In the packet generation step S140, the packet is generated including the hash value generated in the hash value generation step S130.

When the packet is an initial packet, the packet includes a digital signature to be transmitted in step S150, and when the packet is not the initial packet, the packet is generated including a message to thereby be transmitted in step S150.

In this manner, the initial packet may be authenticated through the digital signature on the reception side, and packets after the initial packet may be authenticated using the message included in the packet and a hash value included in the immediately previous packet.

Figure 3:
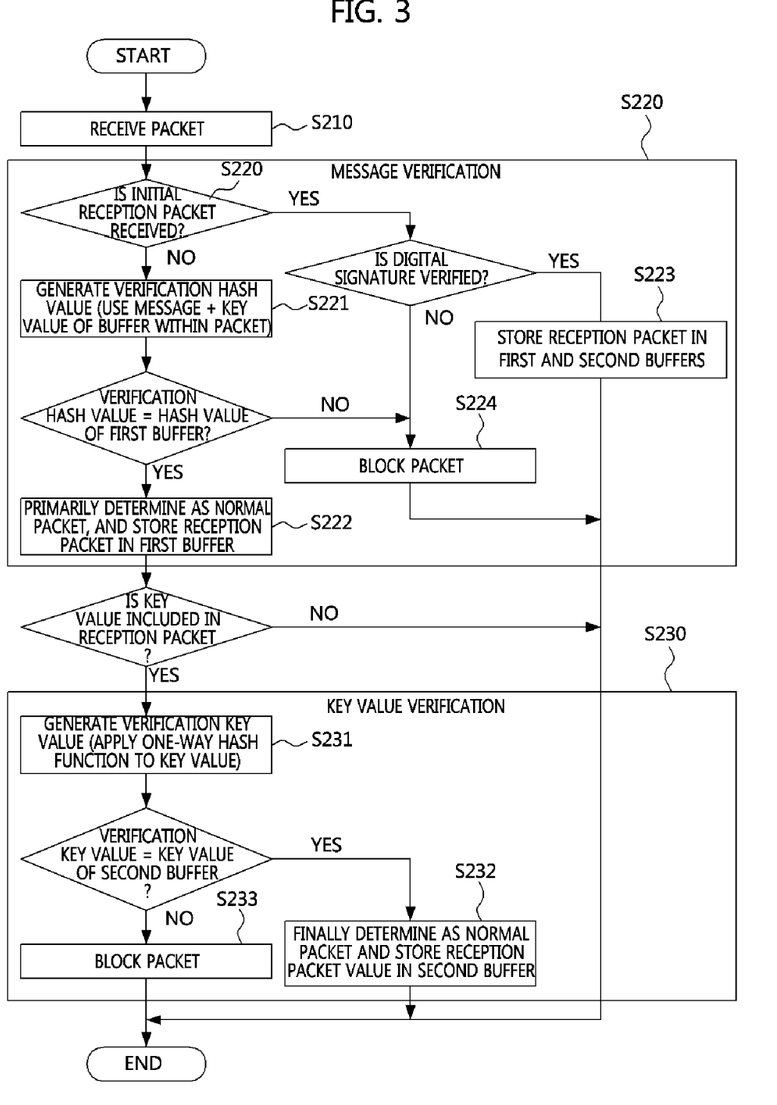
FIG. 3 is a flowchart illustrating an authentication process of a packet on a reception side according to an embodiment of the present invention.

FIG. 3 is a flowchart illustrating an authentication process of a packet on a reception side according to an embodiment of the present invention.

Referring to FIG. 3, a source authentication process of the reception packet of the reception side according to an embodiment of the present invention includes a packet reception step S210, a message verification step S220, and a key value verification step S230.

In addition, referring to FIG. 3, the source authentication process of the reception packet of the reception side according to an embodiment of the present invention will be described as follows.

In the message verification step S220, verification of a message for message source authentication is performed on a reception packet received in the packet reception step S210.

In this instance, when the reception packet is not the initial packet, a verification hash value is generated by applying a hash function using a message included in the reception packet and a key value.

In this manner, when the generated hash value is equal to a hash value received through a previous packet based on a comparison therebetween, the reception packet is determined as a packet from a normal source. That is, in this instance, a hash value of a current message which is included in the previous packet and transmitted may be stored in a buffer. In addition, the key value included in the reception packet may be a key value included in a packet which is currently received, or a key value which is received through the previous packet and stored in the buffer.

That is, since the key value of one of every two packets is publicized, that is, each of $2n^{th}$ packets is publicized, the key value of a current packet is referred to when the key value is publicized through the current packet, and the key value stored in the buffer is referred to when the key value is publicized through the previous packet.

Meanwhile, after the key value is publicized, a new key value is selected.

Meanwhile, when the reception packet is an initial packet, a digital signature included in the reception packet is verified, and the reception packet is determined as a packet from a normal source.

In the key value verification step S230, the key value transmitted through the packet is verified, and the key value verification is not performed on each packet, but performed on the packet in which the key value is publicized.

In the key value verification step S230, the reception packet is determined as the packet from the normal source, and when the key value is included in the reception packet, that is, when the key value is publicized through the reception packet, a verification key value is generated by applying a one-way hash function to the key value included in the reception packet.

When the generated verification key value is equal to the previously transmitted key value based on a comparison therebetween, the reception packet is determined as the packet from the normal source.

For example, when the key value of one of every two packets is publicized, the verification key value should be compared with the key value which is publicized through the packets two packets before.

Accordingly, in order to perform the key value verification step S230, an additional buffer for storing data of the packets two packets before may be required.

The source authentication according to the present invention is sufficiently performed by the message verification step S220, but the key value verification step S230 is additionally performed when packet delay occurs due to problems in communication, thereby more accurately performing the source authentication.

A case in which the key value verification step S230 is required will be described later.

Hereinafter, a process of generating packets in a multicast environment according to an embodiment of the present invention and a process of verifying the packets will be described.

Figure 4:
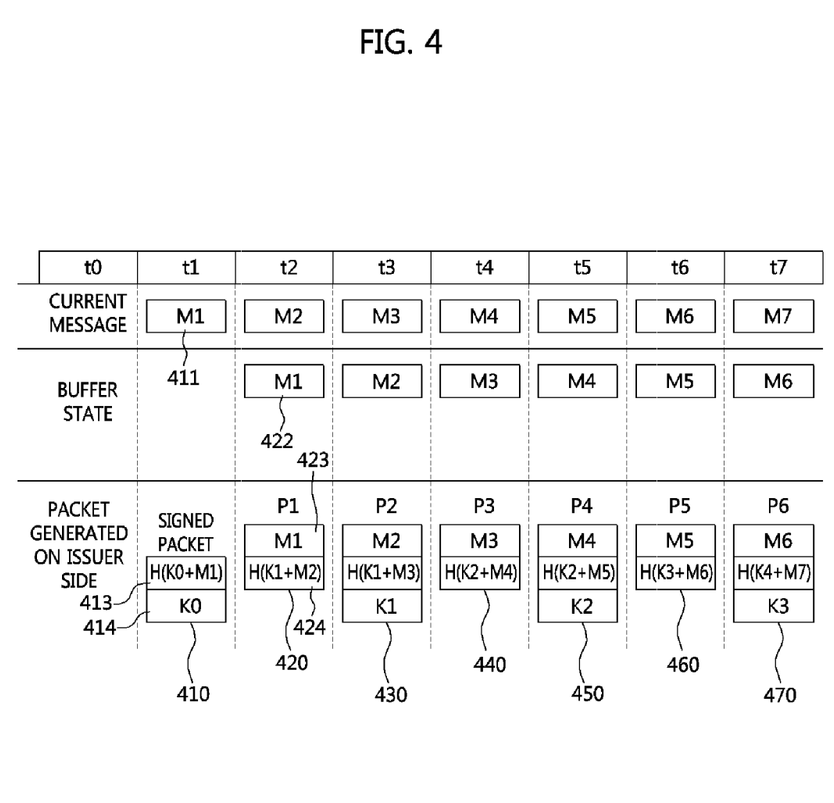
FIG. 4 is a conceptual diagram illustrating a hash value included in generated packets and a state of a buffer in time series according to an embodiment of the present invention.

Example of Source Authentication in Multicast Environment According to the Present Invention FIG. 4 is a conceptual diagram illustrating a hash value included in generated packets and a state of a buffer in time series according to an embodiment of the present invention.

Referring to FIG. 4, a message included in a packet including authentication information which is sequentially generated by an issuer is schematized and shown.

In FIG. 4, a hash value 413 with respect to a first message is digitally signed to be transmitted to a first packet 410, and then the message and a hash value with respect to a message to be included in a next packet are transmitted to a next packet.

In this manner, a subscriber that is a reception side performs source authentication through a digital signature included in a packet 410 to be initially transmitted, and integrity and source authentication about a message, which are successively received based on a comparison between the hash value included in the previously transmitted packet and the hash value calculated with respect to the message included in the currently transmitted packet, are performed with respect to a next packet.

For example, in FIG. 4, a process of generating the packet including each message and the hash value on the transmission side over time in order from t0 to t7 is sequentially shown. In this instance, the transmission side and the reception side share a one-way hash function F for calculating a key value Ki in advance.

In this process, as described in FIG. 1, in FIG. 4, when a message M1 411 is generated, a message M1 422 is stored in a buffer, a value 414 of K0 of a one-way hash value generated to satisfy $Ki=F(Ki+1)$ that is generated in advance and a hash value 413 with respect to the message M1 are generated, and the hash value 413 and the value 414 of K0 are digitally signed to be transmitted.

Thereafter, when a message M2 is generated, a hash value 424 with respect to a value K1 and the message M2 is generated, and transmitted together with the message M1 422 stored in the buffer.

In addition, when calculating a hash value with respect to a next packet message, the used key value is included for each of $2n^{th}$ (n being a natural number) packets 430, 450, and 470 after transmission of an initial packet to thereby be publicized to the reception side, and a new key is used after the corresponding key is publicized.

Since the new key is used on the transmission side in the opposite order to that in which the key values are generated, it is impossible to predict a next key value using the currently received key value on the reception side due to characteristics of the one-way hash function.

Through this process, subscribers receiving the packet that is digitally signed may perform source authentication as to whether the packet is transmitted from a normal issuer.

In addition, a hash value with respect to a message to be included in the next packet is included in the packet, so that a hash value of a next message is calculated, and whether integrity of the message is protected may be easily determined by comparing the hash value with respect to the message and the hash value of the next message.

Accordingly, in this manner, a transmission delay phenomenon in which all messages to be transmitted are buffered in an existing scheme by an issuer, and then the buffered messages are transmitted may be significantly reduced.

In addition, the hash value is calculated including the key value without simply calculating only the hash value with respect to the next message, and therefore a malicious attacker may be prevented from freely operating the hash value of the packet.

Figure 5:
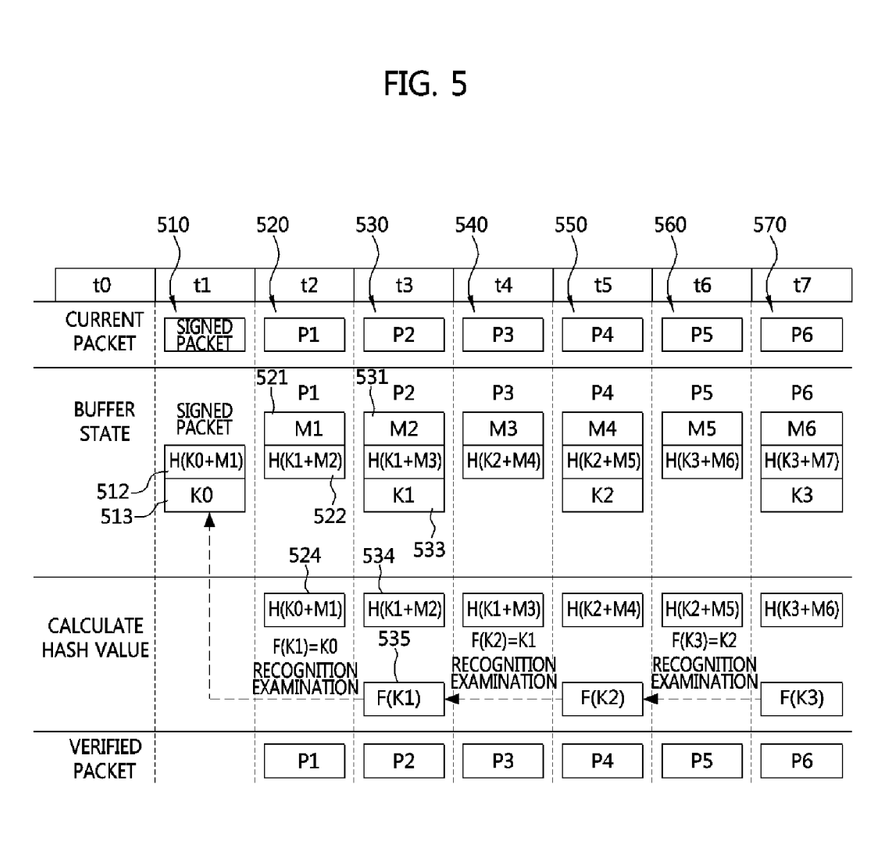
FIG. 5 is a conceptual diagram illustrating a hash value included in received packets and a state of a buffer in time series according to an embodiment of the present invention.

FIG. 5 is a conceptual diagram illustrating a hash value included in received packets and a state of a buffer in time series according to an embodiment of the present invention.

Referring to FIG. 5, a message included in a packet including authentication information that is sequentially received by a subscriber is schematized and shown.

For example, as shown in FIG. 5, when a packet 510 that is first digitally signed arrives, a hash value 512 with respect to a message M1 521 to be included in a next packet and a value 513 of K0 are stored in a buffer.

In this instance, since a subscriber knows the value 513 of K0, but does not know the message M1, the subscriber cannot perform malicious changes.

When a second packet P1 520 arrives, a hash value 524 is calculated using the message M1 521 included in this packet and the value 513 of K0 stored in the buffer, and it is determined whether the hash value 524 is equal to the hash value 512 of H(K0+M1).

When the hash value 524 is equal to the hash value 512, the packet P1 520 may verify that the packet is a packet from a normal source and contents of the message are not changed.

That is, this means that source authentication and integrity are verified. Here, a hash value 522 with respect to a message M2 531 to be included in a next packet is included in the packet P1 520, and is a hash generated using a key value K1 533 that is yet unknown, and therefore malicious changes on the hash value 522 are impossible. That is, because the key value K1 533 is unknown at the time of transmission, if one subscriber tries to generate and transmit a false packet by maliciously impersonating an issuer, it is impossible to generate and transmit the false packet.

Even if an assumed key value K1 and a malicious packet P2 530 including the changed message M3 are generated and transmitted to other subscribers, the key value K0 513 is not obtained when the subscriber that receives the transmitted key value K1 and the malicious packet P2 530 assigns the key value 533 included in the packet to a one-way hash function F, and therefore it is possible to easily determine a corresponding packet as a false packet.

Figure 6:
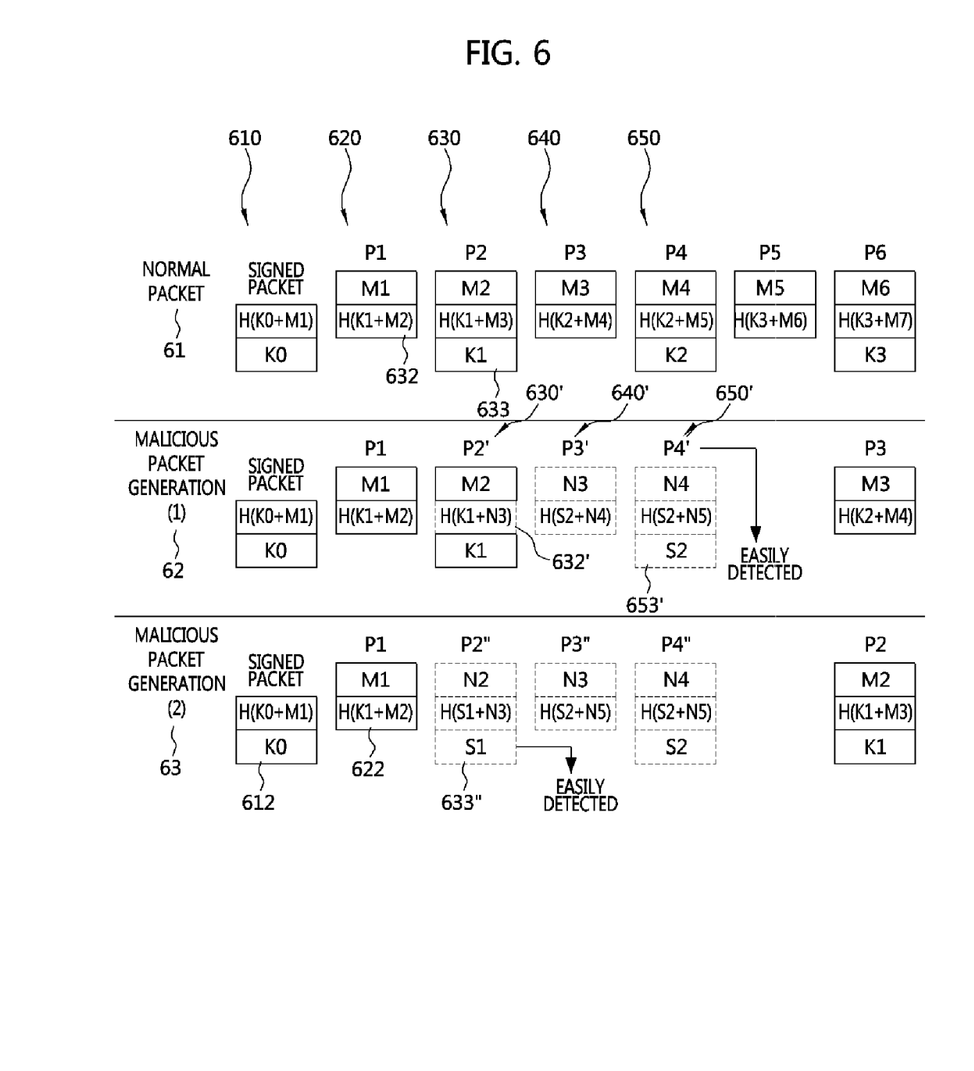
FIG. 6 is a conceptual diagram illustrating an example of detecting a malicious packet when the malicious packet is generated according to an embodiment of the present invention.

FIG. 6 is a conceptual diagram illustrating an example of detecting a malicious packet when the malicious packet is generated according to an embodiment of the present invention.

Referring to FIG. 6, when a malicious subscriber impersonates an issuer using a packet transmitted from the issuer to thereby generate a malicious packet, other subscribers may easily detect the malicious packet.

In FIG. 6, a portion 61 in which normal packets are schematized shows a configuration of a packet when the packet is transmitted from an issuer in a normal way.

In order to transmit a malicious packet, a service-inability state is obtained by attacking the issuer at a specific point in time.

It is assumed that in a situation 62 of malicious packet generation (1) and a situation 63 of malicious packet generation (2), a malicious packet is generated after receiving up to a packet P2 and a packet P1, respectively.

In the situation 62 of the malicious packet generation (1), a first arbitrary subscriber may receive the packet P2 630 including M2, H(K1+M3), and K1, and then transmit a malicious packet P2' 630' in which H(K1+M3) 632 is changed to H(K1+N3) 632' to other subscribers. This is because the first subscriber may know K1 633 at this point in time, and K0=F(K1) may be verified.

However, since other subscribers receive the packet P2 630 at the point in time at which the first subscriber receives the packet P2 630, the packet P2' 630' that is consecutively received may be easy to determine as the malicious packet.

However, if a subscriber who has not correctly received the packet P2 630 due to packet delay or loss of a communication channel is present, the subscriber may misdiagnose the packet as a normal packet. Here, when consecutively receiving a packet P4' 640' which is changed, the subscriber may know that P2' 630', P3' 640', and P4' 650' are all false packets because a result value F(S2) obtained by applying a one-way hash to a key value S2 643' included in the packet P4' 640' is different from a key value K1 633'.

Accordingly, effective verification with respect to all packets may be performed by only managing at least two packet buffers.

In addition, when it is assumed that the packet delay or loss on the communication channel is not severe, effective source authentication with respect to the packets may be possible by performing message verification while maintaining only one packet buffer.

In addition, in a case of a malicious packet P2" 633" in the situation 63 of the malicious packet generation (2), it may be easily known that the packet P2" 633" has been changed because a hash value 622 with respect to the message M2 of the packet P2 is included in advance in the packet P1 620 that has been previously received, and a hash value F(S1) calculated using S1 633" that is included instead of K1 633 is different from K0 612.

As described above, the source authentication method and apparatus according to the embodiments of the present invention combine a message to be transmitted after and a key value to calculate a hash value, and then transmit the hash value to a previous packet, and thereby a source authentication process may be implemented with only one packet buffer on each of the transmission side and the reception side. As a result, effective low-cost multicast authentication may be performed by reducing a variety of loads such as buffer management, key calculation costs, and the like.

In addition, even in the worst situation such as a poor network state, or the like, source authentication may be performed by operating two packet buffers by the reception side.

In addition, a malicious change in the packet may be easily determined.

As described above, the source authentication is performed within a minimum number of buffers and a minimum calculation load, and therefore the present invention is effectively applied to issuers and subscribers which are operated in embedded devices having less memory and low processing performance.

While the example embodiments of the present invention and their advantages have been described in detail, it should be understood that various changes, substitutions and alterations may be made herein without departing from the scope of the invention.

What is claimed is:

1. A source authentication method which is performed with respect to a transmission packet on a message transmission side, comprising:

generating a first hash value of a first message by applying a first hash function using a key value;

generating the transmission packet including the first hash value;

generating a next packet including the first message; and embedding the key value in the transmission packet or the next packet, wherein the key value is one of at least one key value generated in advance by applying a second hash function, and the first message is not included in a same packet containing the first hash value, wherein the second hash function is a one-way hash function, and the key value is one of at least one key value generated by applying the one-way hash function before generating an initial transmission packet, and wherein the key value used in the generation of the first hash value is included in a $2n^{th}$ transmission packet after the initial packet is transmitted, wherein n is a natural number, one different key value is selected from among the key values generated in advance as the key value used in the generation of the first hash value after the transmission packet including the key value is transmitted, and the one different key value is selected in the opposite order to that in which the key values are generated.

2. The source authentication method according to claim 1, further comprising: digitally signing the transmission packet when the transmission packet is an initial packet.

3. The source authentication method according to claim 1, wherein, when the transmission packet is not an initial packet, generating the transmission packet including a second message to be currently transmitted.

4. The source authentication method according to claim 1, wherein the source authentication method is performed in a multicast transmission environment, and the message transmission side is a message issuer and a message reception side is a message subscriber.

5. A source authentication method which is performed with respect to a reception packet on a message reception side, comprising:
   receiving the reception packet,
   determining if the reception packet is not an initial packet of a transmission,
   generating a verification hash value of a message included in the reception packet by applying a first hash function and a key value in response to the determination that the reception packet is not the initial packet, and
   determining the reception packet as a packet from a normal source when the verification hash value is equal to a received hash value received through a previous packet,
   wherein the key value is included in the reception packet or the previous packet, and the message is not included in a same packet as the received hash value,
   wherein the key value is one of at least one key value generated by applying a second hash function before the generation the initial packet and the second hash function is a one-way hash function, and
   wherein the key value used in the generation of the verification hash value is included in an $2n^{th}$ received packet after the initial packet, wherein n is a natural number, one different key value is received from among the key values generated in advance as the key value in the generation of the verification hash value after the reception packet including the key value is received, and the one different key value is received in the opposite order to that in which the key values were generated.

6. The source authentication method according to claim 5, further comprising:
   when the reception packet is determined as the packet from the normal source in the verification of the message, and the key value is included in the reception packet,
   verifying a key value including determining the reception packet as the packet from the normal source when a value generated by applying a one-way hash function to the key value included in the reception packet is equal to a previously transmitted key value based on a comparison therebetween.

7. The source authentication method according to claim 5, wherein, when the reception packet is the initial packet, the reception packet is determined as the packet from the normal source by verifying a digital signature included in the reception packet.

8. A source authentication apparatus with respect to a transmission packet, for a message issuer side of a multicast transmission environment, comprising:
   a message buffer for storing a first message to be transmitted;
   a key value selection unit configured to select one key value to be used in generation of a first hash value from among at least one key value generated in advance, and
   to generate the key values in advance by applying a one-way hash function when the transmission packet is an initial packet of a transmission;
   a hash value generation unit configured to generate the first hash value of a second message to be included in a next packet by applying a first hash function using the key value generated by the key value selection unit; and
   a packet generation unit configured to generate the transmission packet including the first hash value and generate the next packet including the second message,
   wherein the packet generation unit further configured to generate the transmission packet including the first message stored in the message buffer when the transmission packet is not the initial packet, and stores, in the message buffer, the second message to be included in the next packet after generating the transmission packet, and wherein the key value is included in the transmission packet or in the next packet and the second message is not included in a same packet as the first hash value,
   wherein the at least one key value is generated by applying the one-way hash function before generating the initial packet, and
   wherein the packet generation unit generates the transmission packet by enabling the key value used in the generation of the first hash value to be included in the transmission packet when the transmission packet is an $2n^{th}$ packet after the initial packet, wherein n is a natural number, the key value selection unit selects one different key value from among the generated key values after the transmission packet including the key value is generated, and the one different key value is selected in the opposite order to that in which the key values are generated.

* * * * *